(12) United States Patent
Yeo et al.

(10) Patent No.: US 11,592,609 B2
(45) Date of Patent: Feb. 28, 2023

(54) SINGLE EDGE LIT LIGHTING MODULE WITH BI-LOBED LIGHT DISTRIBUTION

(71) Applicants: Fusion Optix, Inc., Woburn, MA (US); Axis Lighting, Inc., LaSalle (CA)

(72) Inventors: Terence Yeo, Boston, MA (US); Timothy Kelly, Brookline, MA (US); Howard Yaphe, Saint-Laurent (CA); Stephane Beland, Saint-Jean-sur-Richelieu (CA); Jean Gagne, Saint-Lazare (CA); Andrew Miles, Cornwall (CA)

(73) Assignees: Fusion Optix, Inc., Woburn, MA (US); Axis Lighting, Inc., LaSalle (CA)

( * ) Notice: Subject to any disclaimer, the term of this patent is extended or adjusted under 35 U.S.C. 154(b) by 0 days.

(21) Appl. No.: 17/577,277

(22) Filed: Jan. 17, 2022

(65) Prior Publication Data
US 2022/0137287 A1   May 5, 2022

Related U.S. Application Data

(63) Continuation of application No. 17/471,771, filed on Sep. 10, 2021, now Pat. No. 11,333,822, which is a
(Continued)

(51) Int. Cl.
*G02B 6/00* (2006.01)
*F21V 8/00* (2006.01)
(Continued)

(52) U.S. Cl.
CPC ............. *G02B 6/0073* (2013.01); *F21V 7/04* (2013.01); *G02B 6/0036* (2013.01);
(Continued)

(58) Field of Classification Search
CPC ......... F21V 7/04; G02B 6/009; G02B 6/0091; G02B 6/0086; G02B 6/0073; G02B 6/0051
See application file for complete search history.

(56) References Cited

U.S. PATENT DOCUMENTS

| 8,953,926 | B1 * | 2/2015 | Kelly | F21V 7/04 362/628 |
| 2006/0227546 | A1 * | 10/2006 | Yeo | G02B 5/0284 362/227 |

(Continued)

*Primary Examiner* — Gerald J Sufleta, II

(57) ABSTRACT

A single edge lit lighting module is disclosed which produces tailored light distributions valuable in many illumination applications. The lighting module comprises a unique light scattering optical element with volumetric light scattering properties which works in combination with configured reflective surfaces and optional surface relief features, Light distributions attainable using the invention are non-lambertian and anisotropic. Light distributions with one or more lobes of peak intensity can be produced which include, but are not limited to, symmetric and asymmetric batwing distributions, asymmetric distributions for perimeter lighting and symmetric distributions. The invention's unique single edge lit construction provide the means for achieving this without need for conventional two lit edges and within a compact form factor with narrow width, particularly well-suited for linear lighting fixtures that are suspended, surface mounted or recessed. Various embodiments also provide means for adjusting light distributions dynamically to control light output characteristics by the use of an additional cover lens or glare control films, and by controlling the input signals to the LED board included in the assembly.

43 Claims, 17 Drawing Sheets

Related U.S. Application Data continuation of application No. 15/887,801, filed on Feb. 2, 2018, now Pat. No. 11,156,762.

(60) Provisional application No. 62/453,588, filed on Feb. 2, 2017.

(51) Int. Cl.
| | |
|---|---|
| *F21V 7/04* | (2006.01) |
| *F21Y 115/10* | (2016.01) |
| *F21Y 103/10* | (2016.01) |
| *F21S 8/06* | (2006.01) |

(52) U.S. Cl.
CPC ......... *G02B 6/0051* (2013.01); *G02B 6/0058* (2013.01); *F21S 8/06* (2013.01); *F21V 2200/20* (2015.01); *F21Y 2103/10* (2016.08); *F21Y 2115/10* (2016.08); *G02B 6/0055* (2013.01); *G02B 6/0065* (2013.01); *G02B 6/0088* (2013.01)

(56) References Cited

U.S. PATENT DOCUMENTS

| | | | |
|---|---|---|---|
| 2018/0188442 A1* | 7/2018 | Wang | G02B 6/00 |
| 2018/0226003 A1* | 8/2018 | Szekely | G09F 13/04 |
| 2018/0267228 A1* | 9/2018 | Epstein | G02B 6/0036 |

* cited by examiner

| Embodiment | Light Guide Orientation | Light Guide Height (mm) | Light Guide Width (mm) | Light Guide Surface Feature | Bulk Diffusion Concentration | Reflector |
|---|---|---|---|---|---|---|
| A1 | Surface Features on Inner Face | 4.5 | 18 | M1000 lenticular (Fig. 5) | 2% | Specular |
| A2 | Surface Features on Outer Face | 4.5 | 18 | M1000 lenticular (Fig. 5) | 2% | Specular |
| B1 | Surface Features on Outer Face | 4.5 | 18 | M1000 lenticular (Fig. 5) | 2% | Specular |
| B2 | Surface Features on Inner Face | 4.5 | 18 | M1000 lenticular (Fig. 5) | 2% | Specular |
| C2% | Surface Features on Inner Face | 4.5 | 18 | M1000 lenticular (Fig. 5) | 2% | Specular |
| C5% | Surface Features on Inner Face | 4.5 | 18 | M1000 lenticular (Fig. 5) | 5% | Specular |
| C10% | Surface Features on Inner Face | 4.5 | 18 | M1000 lenticular (Fig. 5) | 10% | Specular |
| C20% | Surface Features on Inner Face | 4.5 | 18 | M1000 lenticular (Fig. 5) | 20% | Specular |
| D | Surface Features on Inner Face | 4.5 | 15 | M1000 lenticular (Fig. 5) | 5% | Specular |

Fig. 3A

| Embodiment | Light Guide Orientation | Light Guide Height (mm) | Light Guide Width (mm) | Light Guide Surface Feature | Bulk Diffusion Concentration | Reflector |
|---|---|---|---|---|---|---|
| E1 | Surface Features on outer face (Fig. 14) | 4.5 | 18 | 12-6 pattern (Fig 6 Embodiment E) | 0% | Specular |
| | | | | | 2% | |
| E2 | Surface Features on inner face (Fig. 15) | | | | 5% | |
| | | | | | 8% | |
| F1 | Surface Features on Outer Face (Fig. 16) | | | 6-12 pattern (Fig 6 Embodiment F) | 0% | |
| F2 | Surface Features on Inner Face (Fig. 17) | | | | 2% | |
| | | | | | 5% | |
| | | | | | 8% | |
| G | Surface on Inner Face | | | ETCHED LIGHT GUIDE | 10% | |

Fig. 3B

Surface       Surface       Surface       Surface       Surface
Pattern SP1   Pattern SP2   Pattern SP2   Pattern SP3   Pattern SP3

SINGLE EDGE LIT LIGHTING MODULE WITH BI-LOBED LIGHT DISTRIBUTION

RELATED APPLICATIONS

This application is a continuation of and claims the benefit of non-provisional utility application Ser. No. 17/471,771 "Single Edge Lit Lighting Module With Bi-Lobed Light Distribution" filed Sep. 10, 2021 which is itself a continuation of and claims the benefit of non-provisional utility application Ser. No. 15/887,801 titled "Single Edge Lit Lighting Module Producing Tailored Light Distributions" filed Feb. 2, 2018 which itself claims the benefit of provisional patent application Ser. No. 62/453,588 titled "Single Edge Lit Lighting Module Producing Tailored Light Distributions" filed Feb. 2, 2017.

BACKGROUND

The invention relates to edge lit light fixtures which can be used in a variety of applications. In illumination applications it is often desired or required to control the light distribution in such a way as to output light from the fixture face with a greater proportion of light in a non-normal orientation. A batwing type distribution, named for the wing like appearance when shown on a polar plot of intensity vs. angle, is one such light distribution commonly used in down lighting to provide even floor and/or ceiling illumination with a minimal number of fixtures. For general area coverage, a symmetric batwing with two equal lobes along a given orientation axis is typical. For other applications such as targeting light distribution of a down light towards or away from a wall, fully or partially asymmetric light distributions are needed.

SUMMARY

A single edge lit lighting module is disclosed which produces tailored light distributions valuable in many illumination applications. The light distributions attainable using the invention include, but are not limited to, symmetric and asymmetric batwing distributions, asymmetric distributions for perimeter lighting and symmetric distributions. The invention's unique single edge lit construction provide the means for achieving desired non-lambertian light distributions without need for conventional two lit edges and within a compact form factor with narrow width, particularly well-suited for linear lighting fixtures. Various embodiments also provide means for adjusting light distributions dynamically to control light output characteristics by controlling the input signals to the LED board included in the assembly.

BRIEF DESCRIPTION OF FIGURES

The accompanying drawings are not intended to be drawn to scale. In the drawings, each identical or nearly identical component that is illustrated in various figures is represented by a like numeral.

For purposes of clarity, not every component may be labeled in every drawing. In the drawings:

FIG. 3A and FIG. 3B combined are referred to as FIG. 3, a table listing some embodiments and their key characteristics.

DETAILED DESCRIPTION

Figure 1:
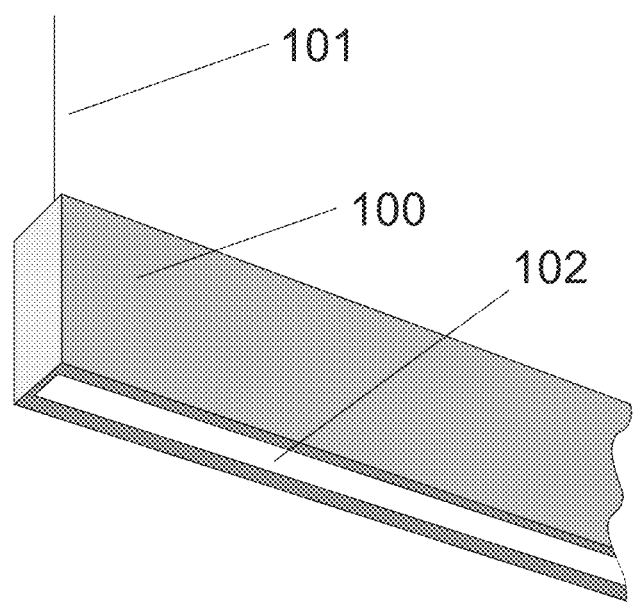
FIG. 1 is an isometric view of a light fixture with an embodiment lighting module.

FIG. 1 is an isometric view of an embodiment light fixture with an embodiment lighting module. The lighting module is contained within a housing 100 supported by a wire hanger 101. Light is transmitted from the fixture through a light fixture output face 102. This could be the output face of the lighting module or an optically transmitting component positioned over the lighting module output face such as a cover lens or a glare control film.

Figure 2:
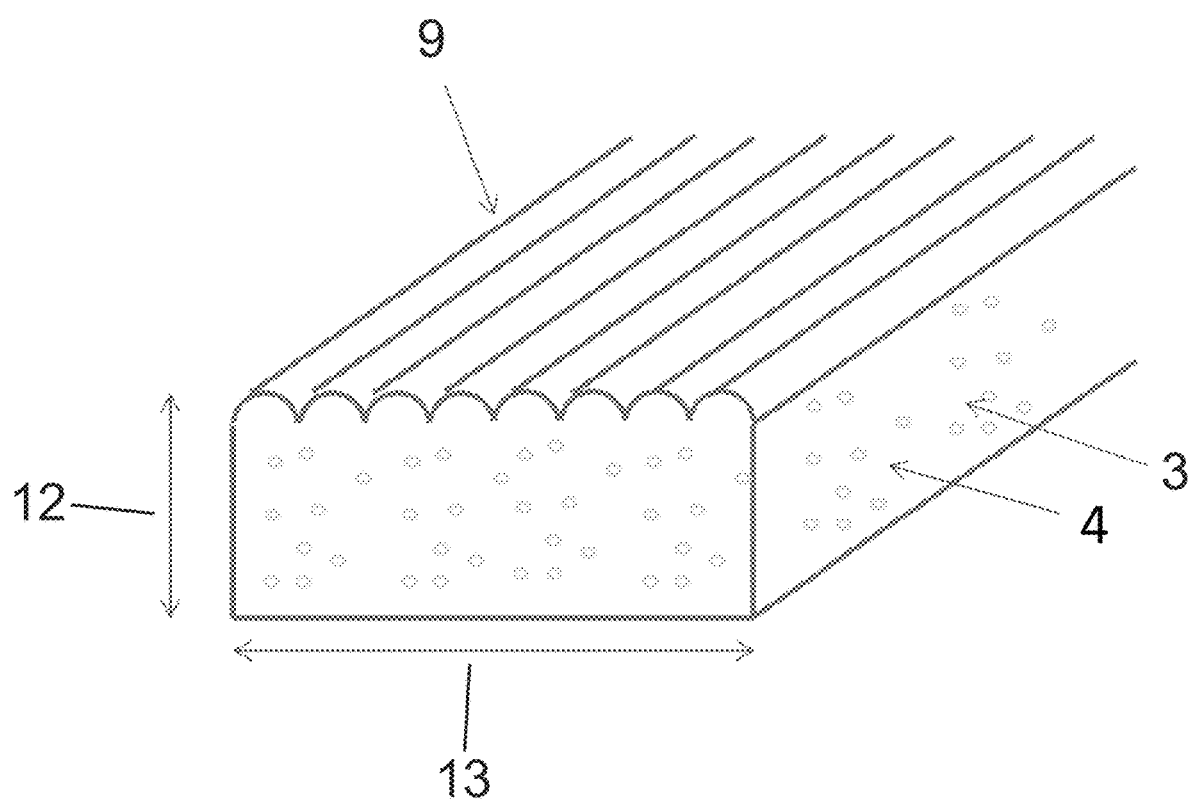
FIG. 2 is an isometric view of a light guide illustrating key elements.

FIG. 2 is an isometric view of a light guide illustrating key elements. Important to various embodiments are dimensions of width and height. Surface features and there pattern of arrangement on a face of the light guide are of importance in converting internal reflection within the light guide to output from the module at desired angular light distribution. Concentration of diffusing blend is an important variable in effecting light scattering properties that influence angular light distribution and uniformity of beam pattern. Volumetric light diffusion is produced by dispersed regions within the light guide having refractive index different than the bulk matrix material. Embodiments listed in the table of FIG. 3 include in the light guide formulation a specific commercially available diffusion resin, Plexiglas® Diffuse V045 blended into clear PMMA resin at the indicated weight percent within a range from zero to 20%. Alternative means in creating dispersed regions of differing refractive index from the light guide matrix material include dosing microbeads into the light guide resin formulation as well as forming second phase regions in situ during by fluid phase mixing of immiscible blends of polymers. In addition to refractive index, the quantity per volume, size, and shape of dispersed regions effect light scattering properties. In the case of immiscible blends formed by fluid phase mixing, the shape of second phase regions may be other that spherical, for example oblate paraboloid, thereby generating non-symmetric light scattering. Processes for fabricating light guides include extrusion and injection molding.

FIG. 3 is a table listing fabricated and tested light module embodiments and their key differentiating characteristics of light guide orientation, light guide height, light guide width, light guide surface feature geometry, bulk diffusion concentration, and reflector type.

Figure 4:
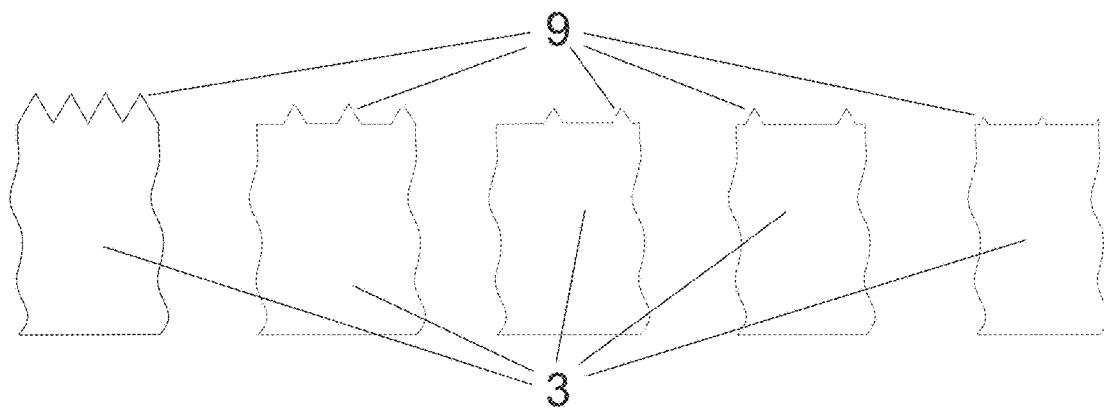
FIG. 4 illustrates various embodiment surface features.

FIG. 4 illustrates example embodiment surface patterns that have been developed to generate alternative beam output light distributions from light guide embodiments. These vary in both surface feature 9 size and shape as well as spacing of flat gaps between features and are labeled as SP1, SP2, SP3, SP4, and SP5. Alternative embodiments may utilize any variety of surface features that can be feasibly fabricated. Extrusion is a process in which lengths of light guide can be feasibly produced with patterns linear in the length dimension. In this case, prisms and lenticular designs can be readily produced. Asymmetric patterns including linear prisms with cross-sectional geometry of sawtooth triangles are also useful embodiments.

Figure 5:
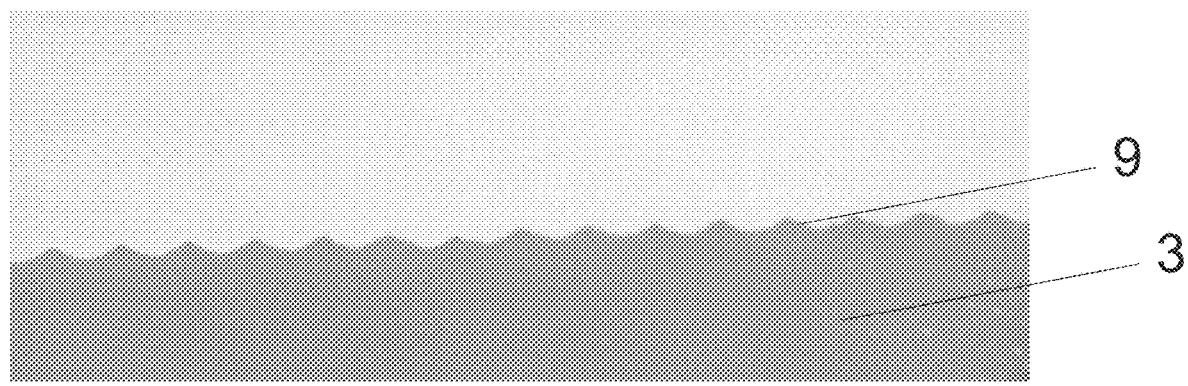
FIG. 5 is a photograph of a cross-section of the embodiment A light guide zoomed in on the surface features.

FIG. 5 is a photograph of a cross-section of the embodiment A light guide 3 zoomed in on the surface features 9. The features are fundamentally triangular prism lenticular with sides of the triangle being slightly concave.

Figure 6:
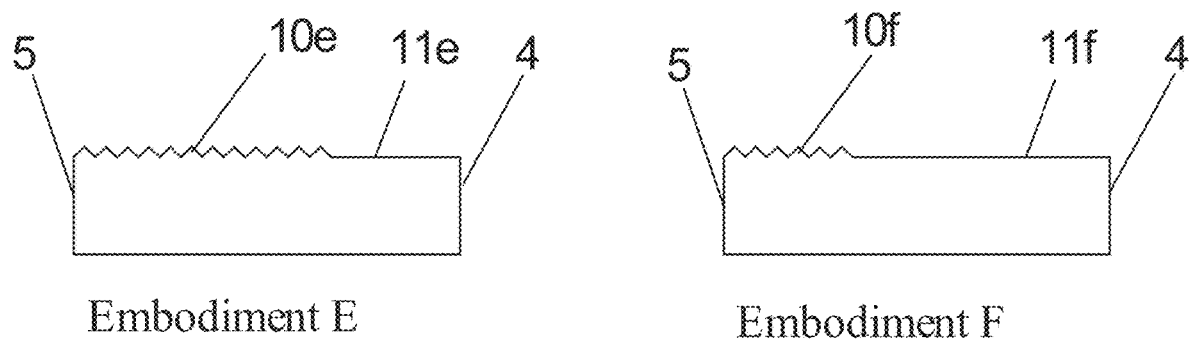
FIG. 6 shows cross-section views of light guide configuration of embodiments E and F.

FIG. 6 shows cross-section views of light guide configuration of embodiments E and F. The width of each light guide is 18 mm with 4.5 mm height. In embodiment E the first 6 mm of light guide surface adjacent to the input surface 4 has a flat surface and the next 12 mm of light guide surface 11e has a lenticular pattern 10e extending to the light guide opposing face 5.

Figure 7:
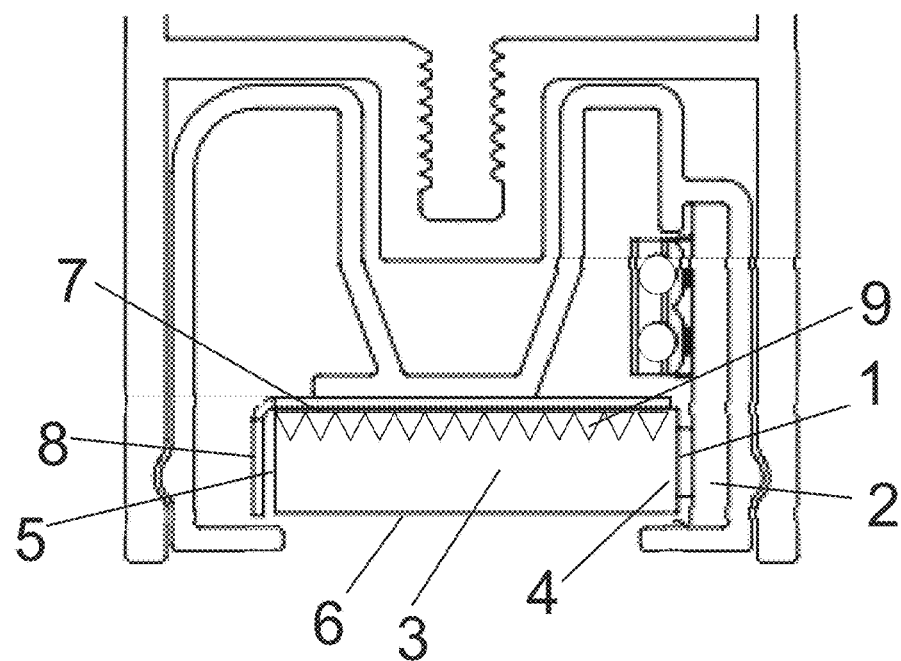
FIG. 7 is a cross-section view of lighting module embodiment A1.

FIG. 7 is a cross-section view of lighting module embodiment A1. The light source consists of individual light emitting diodes (LEDs) 1 mounted on an LED board 2 which is positioned adjacent to the light guide 3. Light emitted from the LEDs 1 enters the light guide through the light guide input face 4 and propagate through the light guide 3, partially internally reflecting from the faces of the light guide due to difference between the refractive index of the light guide and refractive difference of surrounding medium, typically air. Light guides typically comprise optically clear polymer or glass with high level of light transmission and refractive index greater than that of air which is 1.0. For example, polymethyl methacrylate (PMMA) is a common light guide material with refractive index of approximately 1.49. Some light does not internally reflect at the surface but rather escapes from the output face 6, typically with a light distribution centered at an angle less than 90 degrees from the output surface 6 and tilted away from the input face. Light that propagates through the light guide and exits through a light guide opposing face 5 is reflected back into the light guide by the reflector 8, the light guide opposing face effectively becoming in function a light guide input face. The reflector 8 wraps around both the light guide opposing face 5 and light guide inner face 7. Light that escapes the light guide 3 through the inner face 7 is reflected back into the light guide 3. For a reflector that is a specular reflector, light reflects back towards the light guide at the same angle from normal as light incident onto the reflector. Reflectors with a component of diffuse reflectance will produce more light scattering and a more dispersed light reflection.

Figure 8:
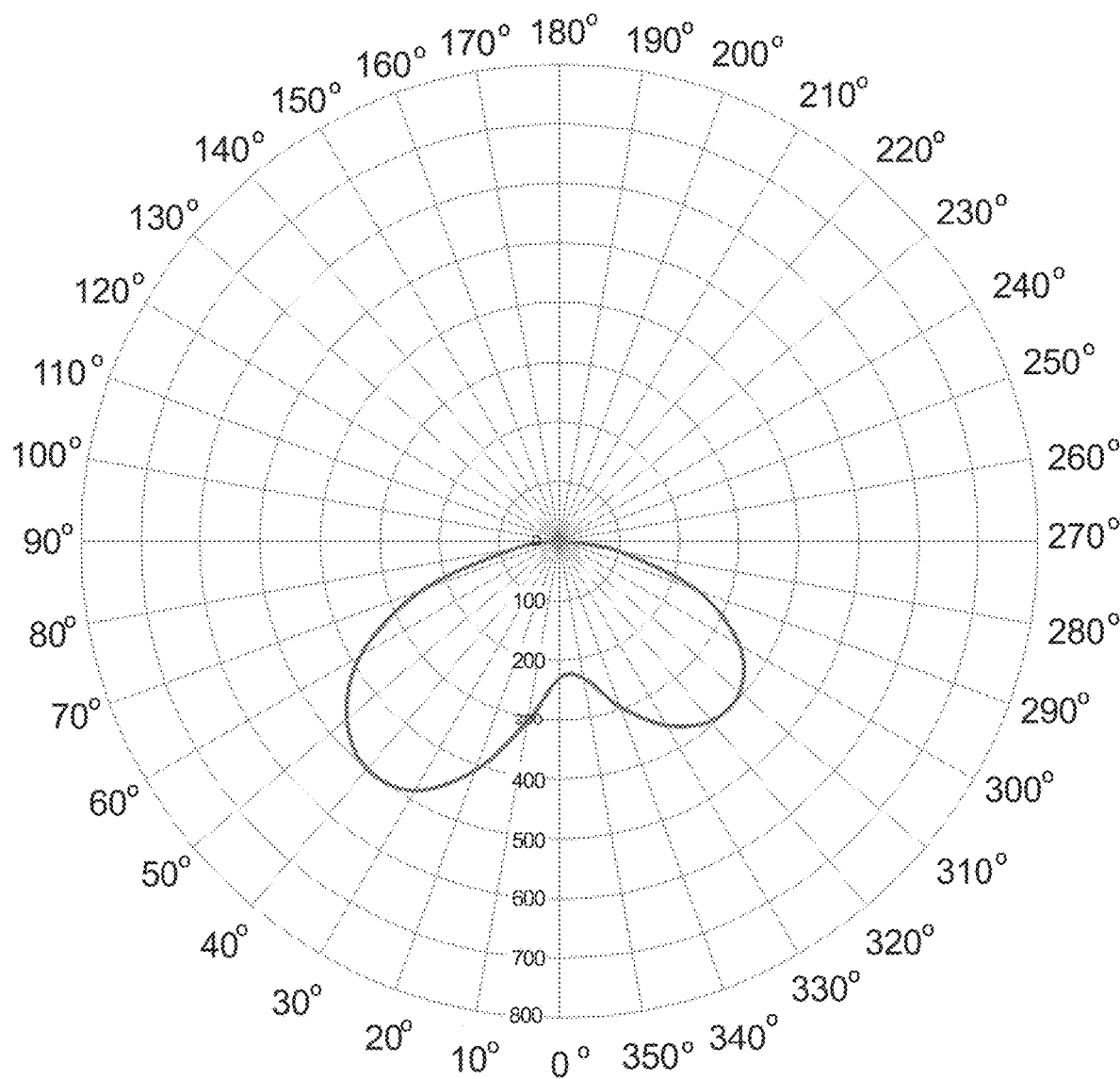
FIG. 8 is a polar plot showing cross-sectional angular light distribution of embodiment A1 lighting module.

FIG. 8 is a polar plot showing cross-sectional angular light distribution of embodiment A1 lighting module with surface features on the inner face of the light guide. The angular lobes are of a generally desirable bat wing type but the angular lobes are uneven and for most applications symmetric distribution would be preferred and specified.

Figure 9:
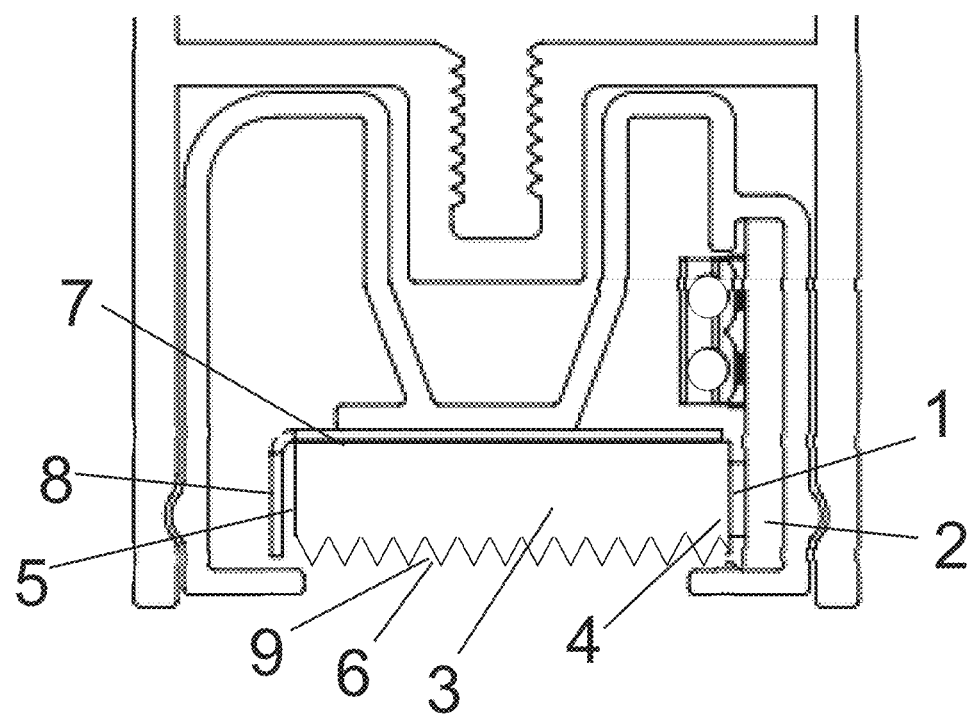
FIG. 9 is a cross-section view of lighting module embodiment A2.

FIG. 9 is a cross-section view of lighting module embodiment A2. This is the same as embodiment A1 except for the orientation of the light guide which has the surface features 9 positioned on the light guide output face 6 instead of on the light guide inner face 7.

Figure 10:
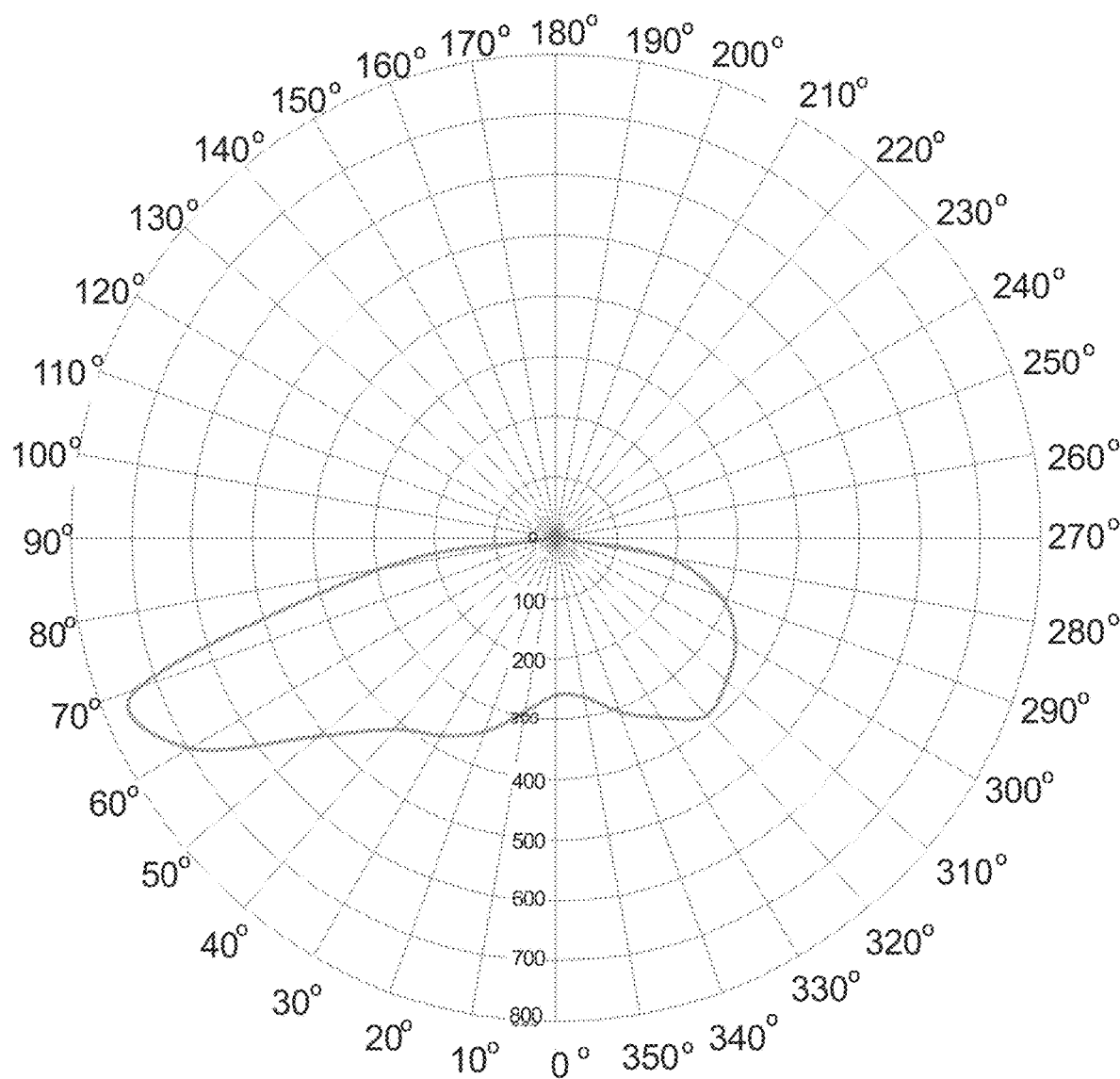
FIG. 10 is a polar plot showing cross-sectional angular light distribution of embodiment lighting module.

FIG. 10 is a polar plot showing cross-sectional angular light distribution of embodiment lighting module A2 with surface features on the output face of the light guide. The angular light distribution is more asymmetric with light emitted less normal to the output surface than embodiment A1 which has the light guide orientation reversed.

Figure 11:
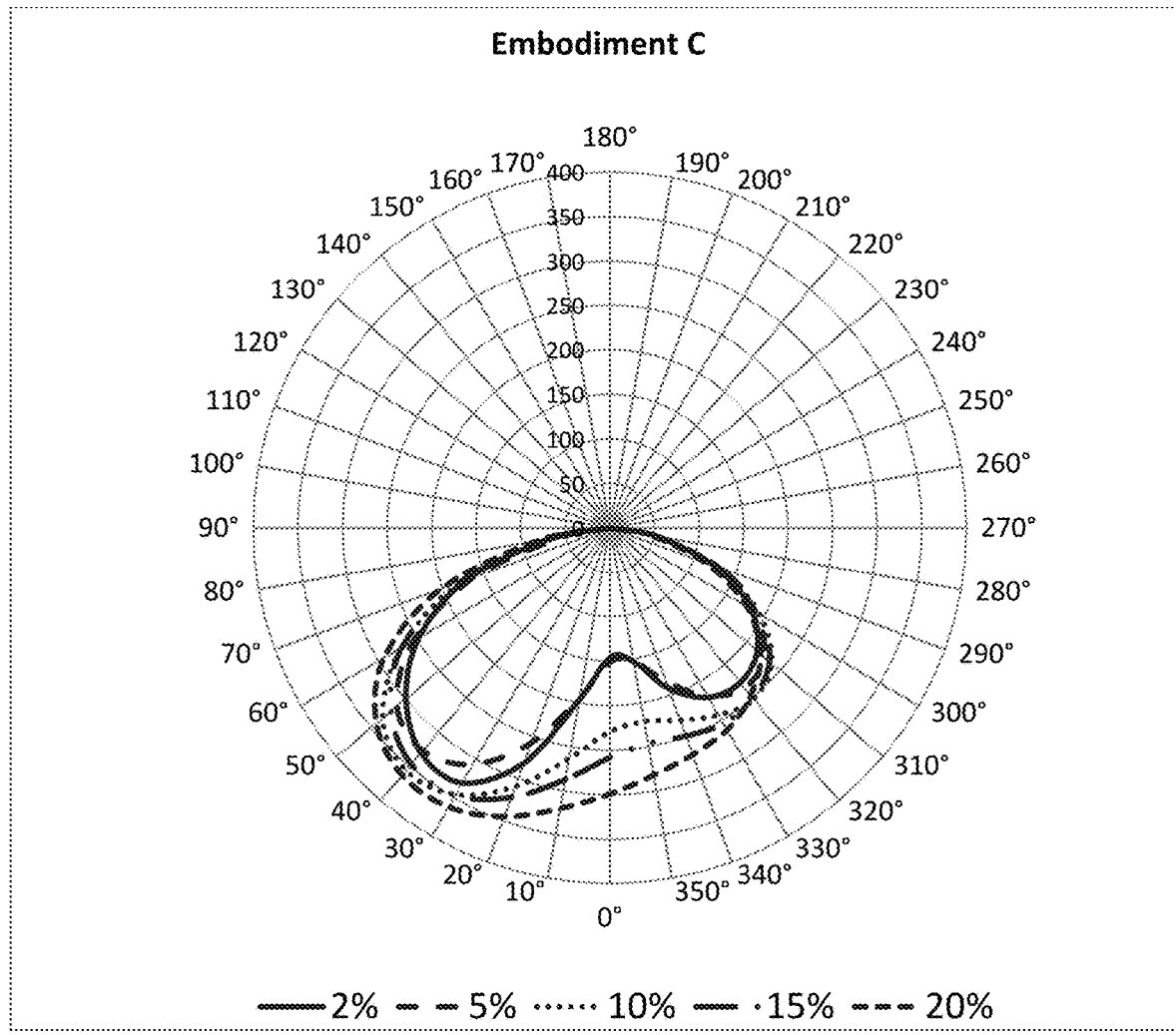
FIG. 11 is a polar plot relating to embodiment C and demonstrates effect of diffusion concentration on cross-sectional angular output.

FIG. 11 is a polar plot relates to embodiment C and demonstrates effect of diffusion concentration on cross-sectional angular output. Increasing diffusion concentration results in more overall output but less distinct bat wing lobes.

Figure 12:
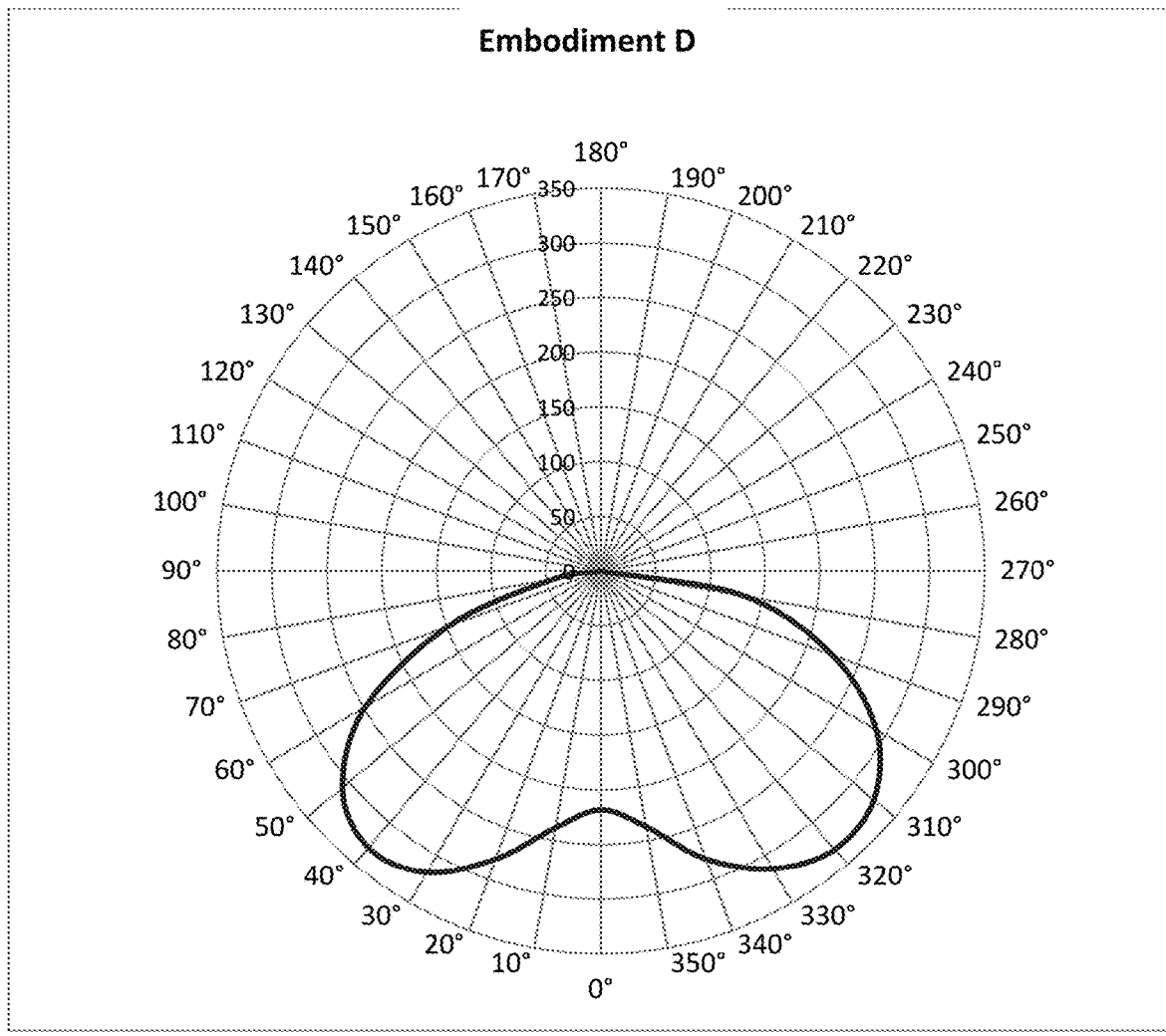
FIG. 12 is a polar plot demonstrating the cross-sectional angular output of embodiment module D showing symmetric batwing light distribution.

FIG. 12 is a polar plot demonstrating the cross-sectional angular output of embodiment module D showing symmetric batwing achieved with a light source input into only one face of a light guide. The batwing light distribution is desirable in many downlighting applications as it provides even illumination when projected onto flat surfaces such as floors and tables. To achieve this light distribution through a light guide with only one light source instead of the customary two provides reduced cost and a more narrow compact form factor.

Figure 13:
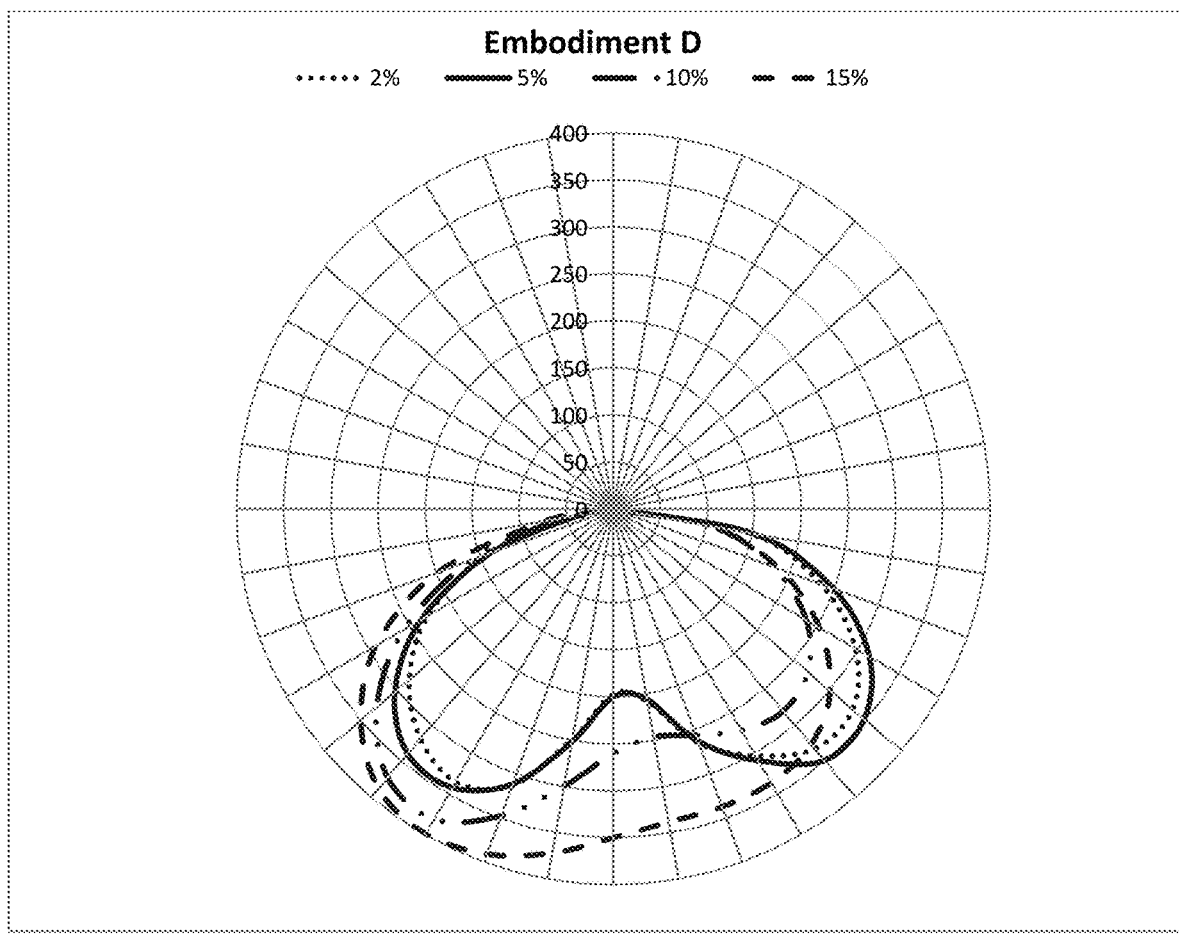
FIG. 13 is a polar plot demonstrating the cross-sectional angular output of embodiment module D with different diffusion levels.

FIG. 13 is a polar plot demonstrating the cross-sectional angular output of embodiment module D with different diffusion levels. The plots show the trends of increased luminous output and decreased angular asymmetry with increasing diffusion amount. The increased diffusion amount increases light scattering and the proportion of light which contacts a face of the light guide at an angle exceeding the critical angle of reflection thus exiting the light guide and not internally reflecting inside the light guide.

Figure 14:
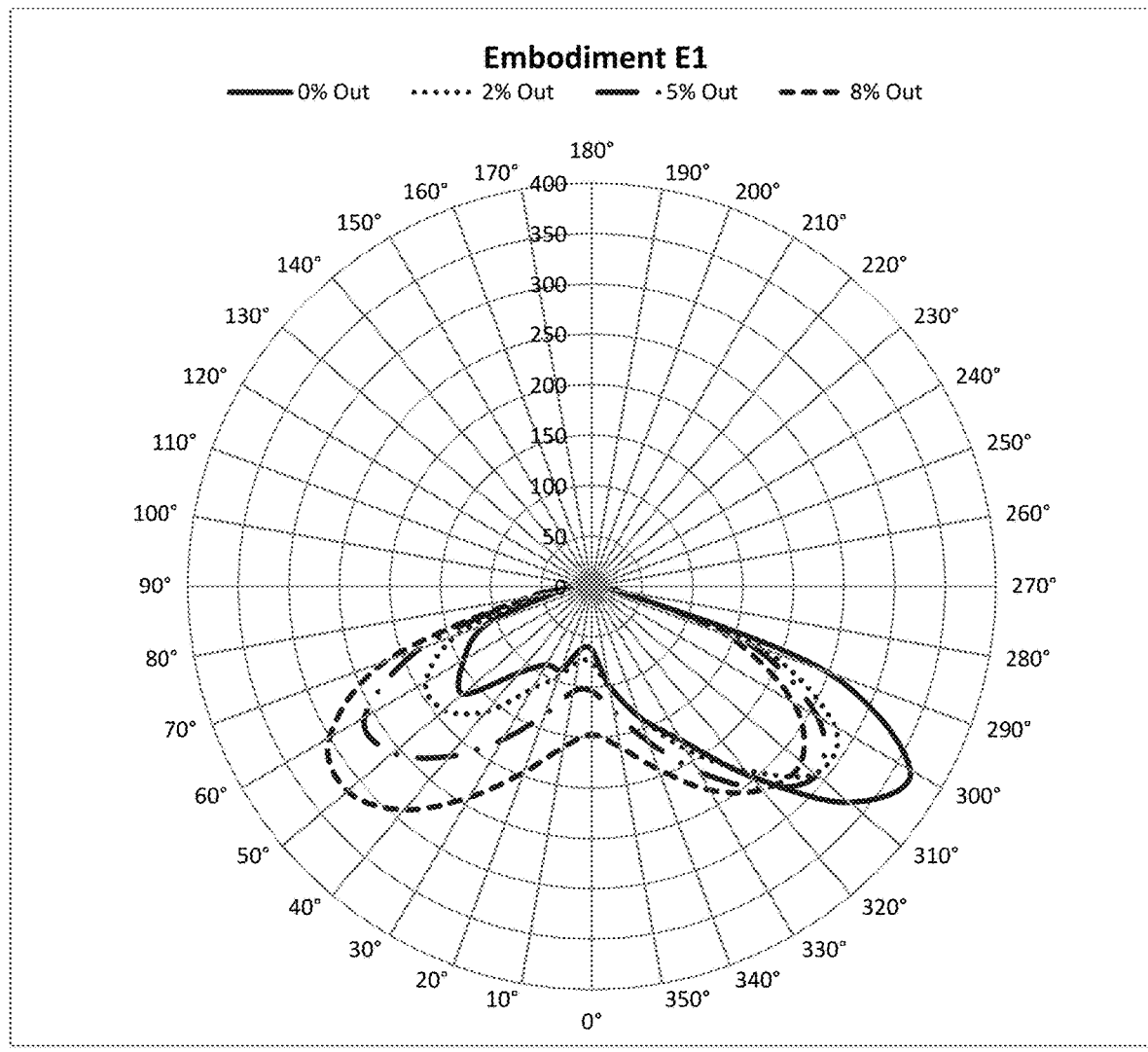
FIG. 14 is a polar plot demonstrating the cross-sectional angular output of embodiment module E1 with 12-6 light guide surface pattern on output face.
Figure 15:
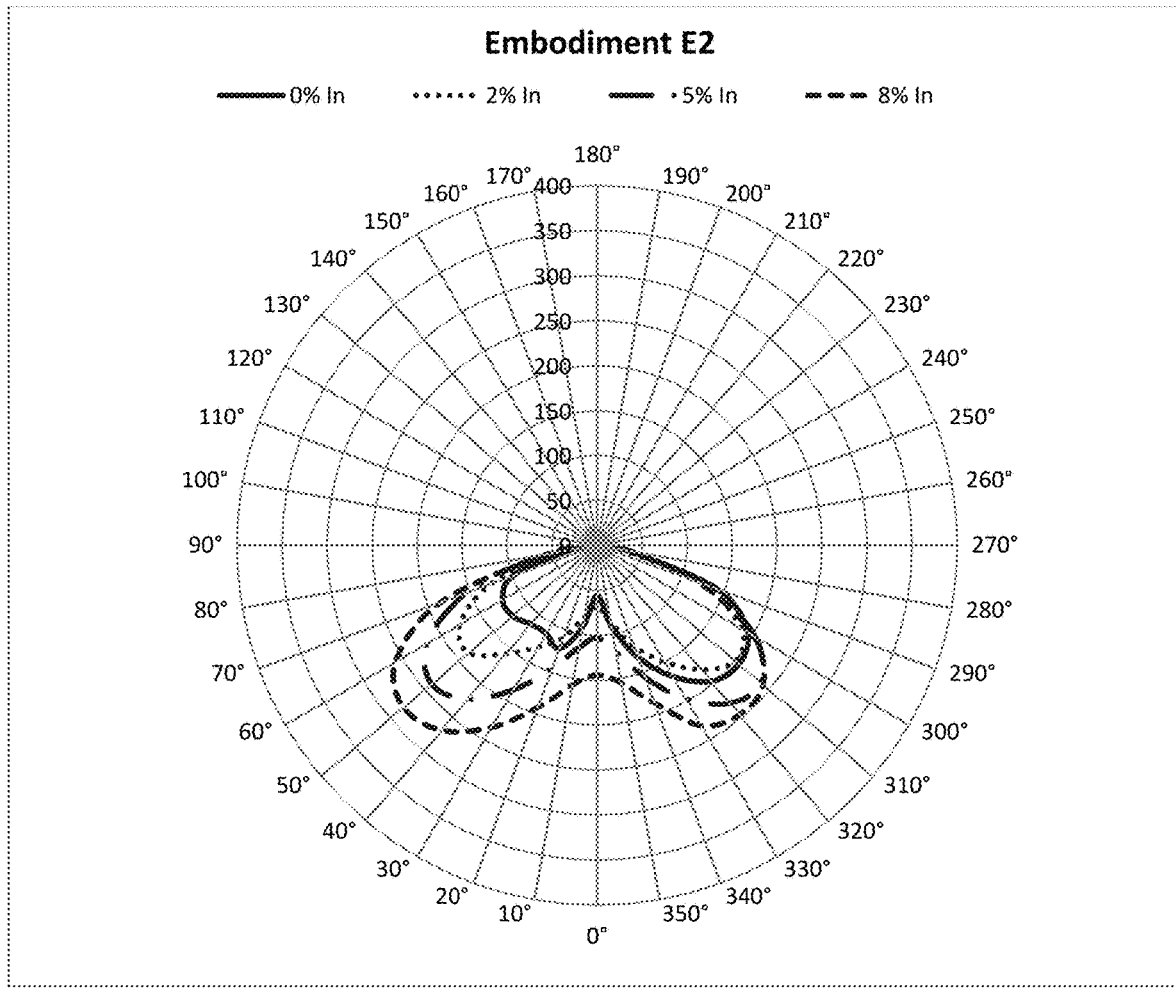
FIG. 15 is a polar plot demonstrating the cross-sectional angular output of embodiment module E2 with 12-6 light guide surface pattern on inner face.

FIG. 14 and FIG. 15 are polar plots demonstrating the cross-sectional angular output of embodiment module E with the surface patterned face of the light guide as the output face (E1—FIG. 14) and inner face (E2—FIG. 15). In this embodiment the light guide has a pattern of surface lenticular area as illustrated as "Embodiment E" in FIG. 6. The light guide has a total width of 18 mm having on one 18 mm wide face an area of flat surface 6 mm wide and an area of lenticular pattern 12 mm wide. All plotted data is from testing done with the flat area of the patterned face adjacent to the input face of the light guide and the lenticular surface area positioned adjacent to face of the light guide opposing the input face. The plots show light distribution results with patterned lenticular face that are significantly different from and useful in a different manner than results from the full surface lenticular of embodiments A-D. In embodiments A-D the light distribution output in all cases is asymmetric with a larger lobe in the direction away from the light guide input face. In embodiment E the larger lobe of asymmetric output is in the direction toward the input light guide face. As diffusion level within the light guides of embodiment E is increased, the light distribution shifts more away from the input face of the light guide. With increasing diffusion level, there is a level where there is a net balance of surface feature and volumetric diffusion that results in a balanced bat wing type light distribution having lobes of light distribution that are largely symmetric and similar. For embodiment E this diffusion level appears by interpolation of FIG. 14 and FIG. 15 plots to be somewhere between 5% and 8%.

Figure 16:
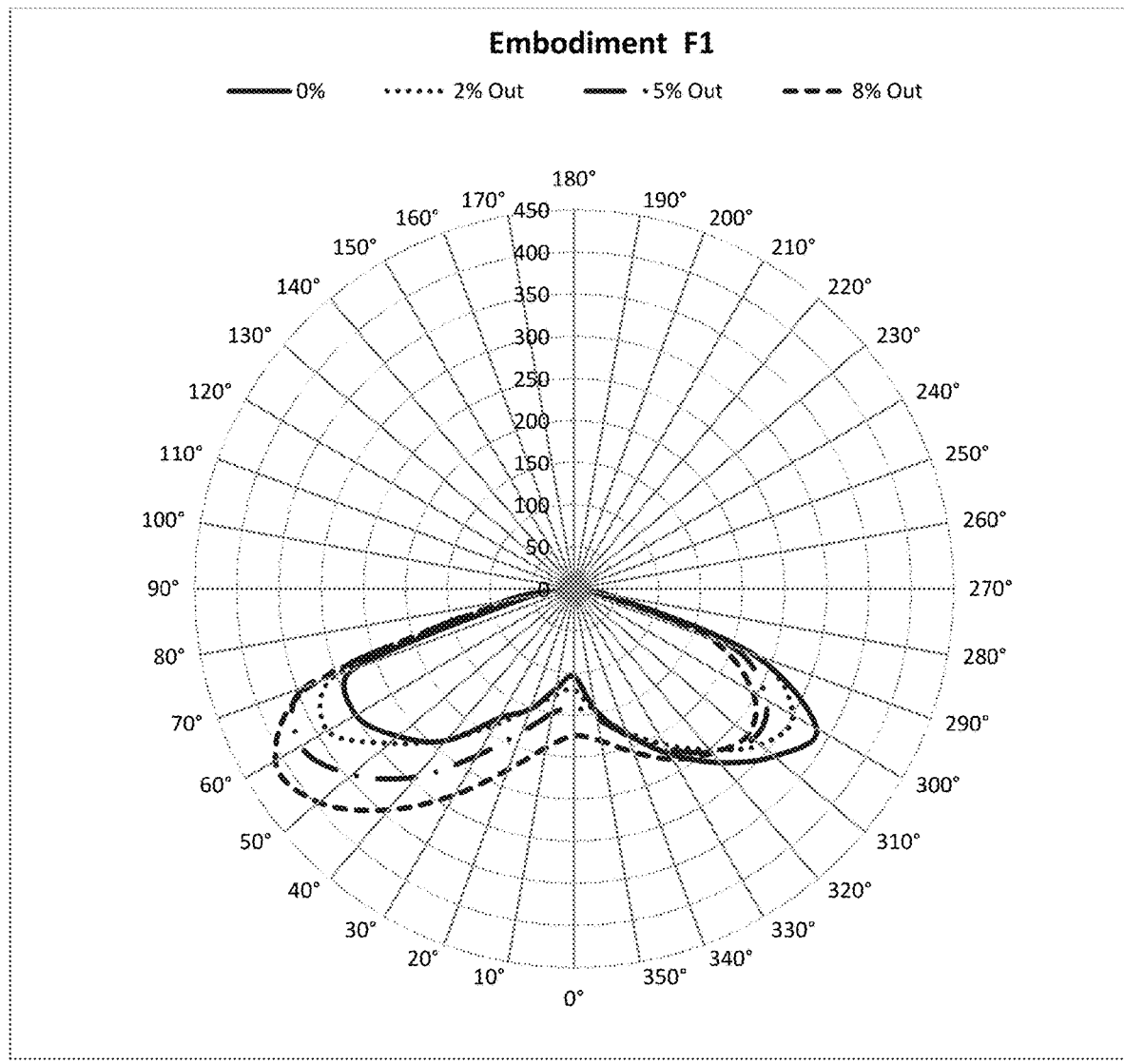
FIG. 16 is a polar plot demonstrating the cross-sectional angular output of embodiment module F1 with 6-12 light guide surface pattern on output face.
Figure 17:
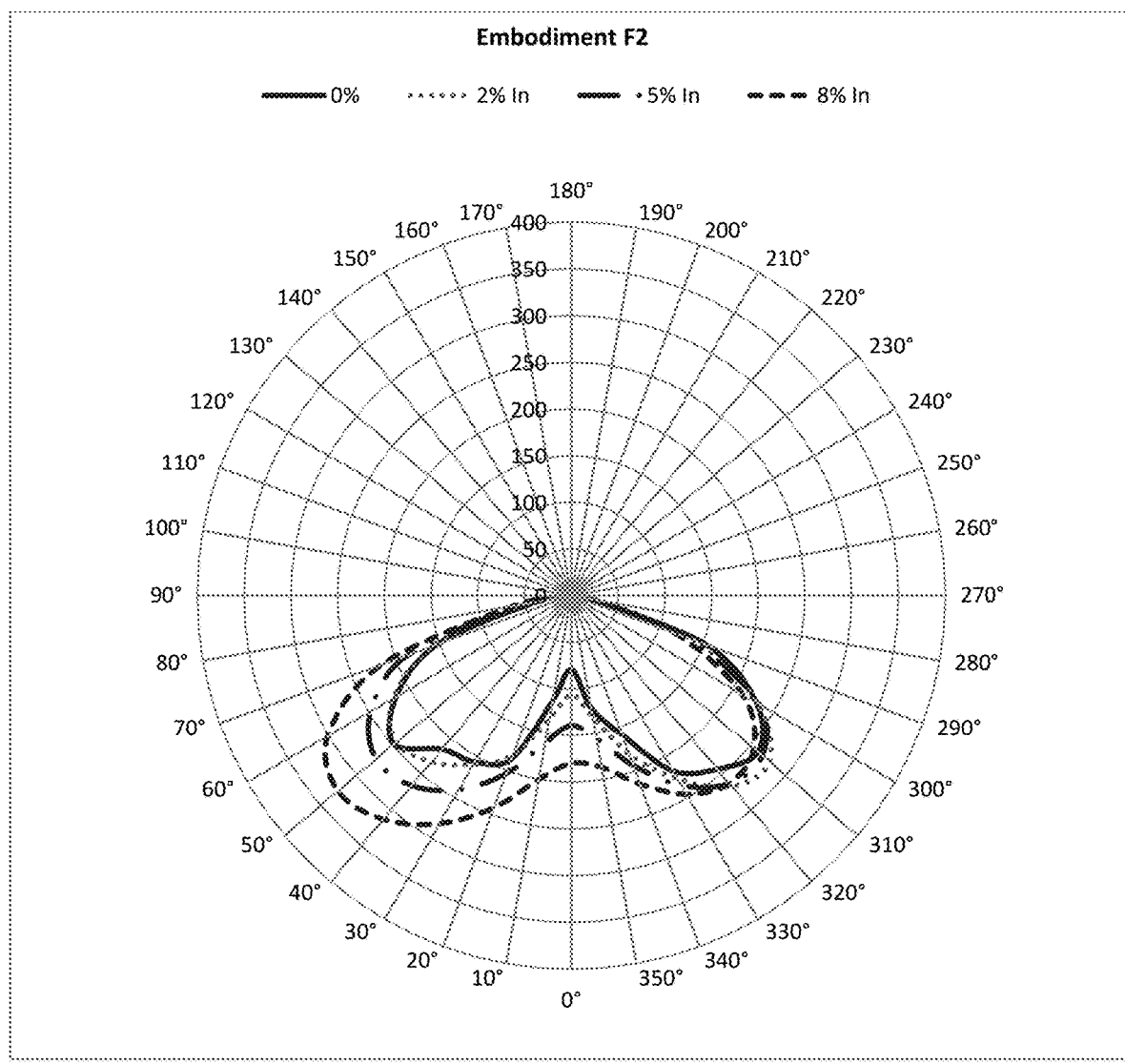
FIG. 17 is a polar plot demonstrating the cross-sectional angular output of embodiment module F2 with 6-12 light guide surface pattern on inner face.

FIG. 16 and FIG. 17 are polar plots demonstrating the cross-sectional angular output of embodiment module F with the surface patterned face of the light guide as the output face (F1—FIG. 16) and inner face (F2—FIG. 17). In this embodiment the light guide has a pattern of surface lenticular area as illustrated as "Embodiment F" in FIG. 6. This light guide is similar to embodiment E but the patterned surface is changed to have 12 mm of flat surface area width and 6 mm of lenticular surface area as compared to 6 mm flat and 12 mm lenticular surface areas of embodiment E. As evidenced by the light distribution polar plots in FIG. 16 and FIG. 17, the degree of light output oriented toward the light guide input face is reduced in embodiment F vs. embodiment E, apparently due to the reduced area of lenticular on the patterned surface. This indicates that the percentage of surface pattern with light redirecting feature chosen can be used to adjust the light distribution and achieve targeted outcomes such as batwing light distribution.

Figure 18:
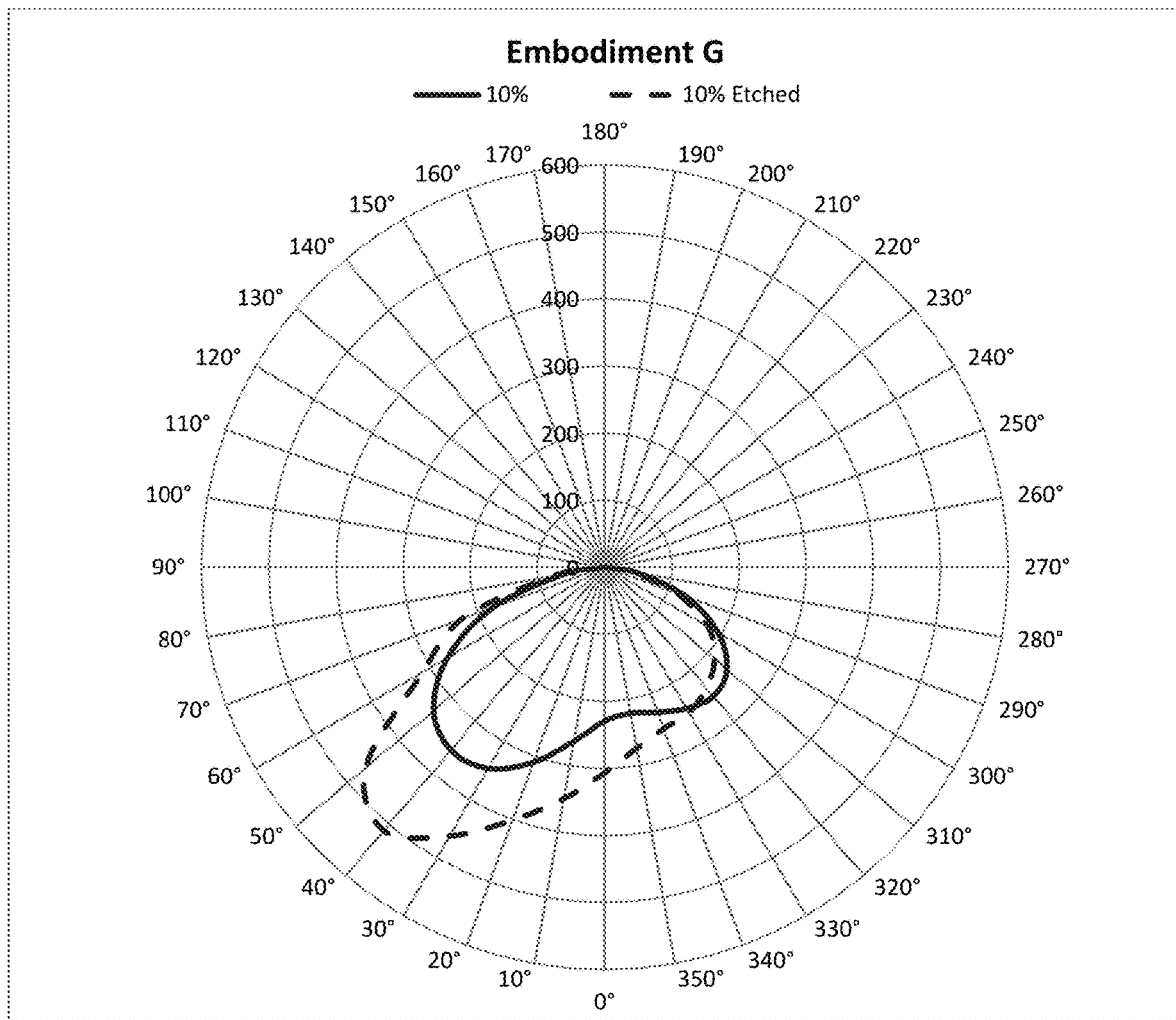
FIG. 18 is a polar plot illustrating the increased cross-sectional asymmetric angular output of embodiment module G having an etched light guide surface.

FIG. 18 is a polar plot illustrating the increased cross-sectional asymmetric angular output of embodiment module G having an etched light guide surface. Compared to a non-etched surface the output is greater.

LIST OF NUMERICAL REFERENCES

1 LED
2 LED board
3 Light guide
4 Light guide input face
Light guide opposing face
6 Light guide output face
7 Light guide inner face
8 Reflector
9 Surface Features
10 Lenticular surface
11 Flat surface
12 Height
13 Width
100 Housing
101 Wire hanger
102 Light fixture output face

What is claimed is:

1. A single edge-lit lighting module comprising;
a) A light scattering optical element comprising:
i) a volume of optical material comprising an optically clear bulk material and dispersed regions of light scattering material of a different refractive index in a configured concentration of materials;
i) an input face,
ii) an opposing face non-adjacent to the input face,
iii) an inner face adjacent to the input face,
iv) an outer face adjacent to the input face,
v) a cross sectional height defined by the distance between the inner face and outer face;
b) one or more LED light sources mounted onto a LED board positioned adjacent to the light scattering optical element and inputting light into its input face;
c) a first reflective surface positioned external of the light scattering optical element and proximate to its inner face wherein light exiting the inner face is reflected back into the light scattering optical element from the first reflective surface;
d) a second reflective surface positioned external of the light scattering optical element and proximate to its opposing face wherein light exiting the opposing face is reflected back into the light scattering optical element from the second reflective surface;
e) A housing configured to support and hold the light scattering optical element, the one or more LED light sources, the LED board, and the reflective surfaces in alignment;
wherein a light output from the light scattering optical element outer face is of a non-lambertian light distribution comprising one or more lobes wherein a peak intensity axis of each lobe is angularly oriented in an oblique, non-normal direction with respect to the outer face and a peak intensity of at least one of the lobes is greater than an output intensity normal to the outer face of the light scattering optical element.

2. The single edge-lit lighting module of claim 1 in which the light source is a linear array of light emitting diodes.

3. The single edge-lit lighting module of claim 1 wherein the light scattering optical element is planar with a height of 4.5 mm.

4. The single edge-lit lighting module of claim 3 in which a width of the light scattering optical element is less than 30 mm.

5. The single edge-lit lighting module of claim 1 wherein the optically transmissive bulk material is either an optically clear polymer or glass and has a refractive index greater than 1.0.

6. The single edge-lit lighting module of claim 1 wherein the dispersed regions of optically transmissive solid material are comprised of microbeads.

7. The single edge-lit lighting module of claim 6 wherein the microbeads comprise PMMA or acrylic.

8. The single edge-lit lighting module of claim 1 wherein the light scattering optical element is further comprising surface features upon a face adjacent to the input face.

9. The single edge-lit lighting module of claim 8 in which the surface features adjusts a symmetry of an angular output versus a light scattering optical element equivalent in bulk material and dispersed regions without surface features.

10. The single edge-lit lighting module of claim 8 wherein the surface features are upon the light scattering optical element outer face.

11. The single edge-lit lighting module of claim 8 wherein the surface features are upon the light scattering optical element inner face.

12. The single edge-lit lighting module of claim 8 in which the surface features comprise a full or partial geometric shape of a sphere, paraboloid, ellipsoid, polyhedron, or polyhedron frustum.

13. The single edge-lit lighting module of claim 8 wherein the surface features re-direct light.

14. The single edge-lit lighting module of claim 8 in which the surface features are arranged in a pattern.

15. The single edge-lit lighting module of claim 14 in which the surface features comprise a lenticular pattern.

16. The single edge-lit lighting module of claim 14 wherein the pattern includes flat areas of the face having no surface features.

17. The single edge-lit lighting module of claim 14 in which the surface feature pattern is comprised of a specific cross-sectional shape comprising a full or partial geometric form of a polygon, truncated polygon, concave polygon, convex polygon, parabola, ellipse, sphere, or arc.

18. The single edge-lit lighting module of claim 8 wherein the presence of the surface features on either inner face or outer face of the light scattering optical element is selectively chosen by orientation of the light scattering optical element with respect to the first reflective surface.

19. The single edge-lit lighting module of claim 18 wherein when the surface features are selectively on the inner face of the light scattering optical element a light distribution is divided by an optical axis normal to the outer face into two portions of substantially equal integrated intensity over angle and when the surface features are selectively on the outer face of the light scattering optical element a light distribution is divided by an optical axis normal to the outer face into two portions of substantially unequal integrated intensity over angle.

20. The single edge-lit lighting module of claim 1 wherein the light scattering optical element is fabricated using extrusion or injection molding techniques.

21. The single edge-lit lighting module of claim 1 wherein the first and second reflective surfaces are regions of a single reflector that wraps around 2 or more faces of the light scattering optical element.

22. The single edge-lit lighting module of claim 1 wherein the first reflective surface or second reflective surface produce specular reflectance of incident light.

23. The single edge-lit lighting module of claim 1 wherein the first reflective surface or second reflective surface produce diffuse reflectance of incident light.

24. The single edge-lit lighting module of claim 1 wherein the light output from the light scattering optical element comprises two distribution lobes which are of substantially similar peak intensity.

25. The single edge-lit lighting module of claim 1 wherein the light output from the light scattering optical element comprises two distribution lobes which are of substantially similar shape.

26. The single edge-lit lighting module of claim 1 wherein the light output from the light scattering optical element comprises two distribution lobes which are of substantially similar tilt degree with respect to normal but oriented in opposing directions.

27. The single edge-lit lighting module of claim 1 wherein the light output from the light scattering optical element comprises two distribution lobes wherein lobe 1 has a greater peak intensity than lobe 2.

28. The single edge-lit lighting module of claim 1 wherein the light output from the light scattering optical element comprises two distribution lobes wherein lobe 1 has a greater angle of tilt than lobe 2.

29. The single edge-lit lighting module of claim 1 wherein the light output from the light scattering optical element comprises two distribution lobes, each having a lobe peak, wherein there is a local minimum intensity point between the two lobe peaks.

30. The single edge-lit lighting module of claim 29 wherein the local minimum intensity point between the two lobe peaks is at or near an axis normal to the outer face.

31. The single edge-lit lighting module of claim 29 wherein the local minimum intensity point between the two lobe peaks is offset from an axis normal to the outer face.

32. The single edge-lit lighting module of claim 1 wherein the light output from the light scattering optical element comprises two distribution lobes which are divided by an optical axis normal to the outer face into two portions of substantially equal integrated intensity over angle.

33. The single edge-lit lighting module of claim 1 wherein the light output from the light scattering optical element comprises two distribution lobes which are divided by an optical axis normal to the outer face into two portions of substantially unequal integrated intensity over angle.

34. The single edge-lit lighting module of claim 1 wherein the adjacent face is perpendicular to the input face.

35. The single edge-lit lighting module of claim 1 wherein the adjacent face is perpendicular to the outer face.

36. The single edge-lit lighting module of claim 1 further comprising an optically transmitting component positioned near the outer face wherein the optically transmitting component is the output face of a light fixture.

37. The single edge-lit lighting module of claim 36 wherein the optically transmitting component is a cover lens.

38. The single edge-lit lighting module of claim 36 wherein the optically transmitting component is a glare control film.

39. A light fixture comprising the single edge lit lighting module of claim 1 wherein the light fixture type is selected from the group consisting of linear, suspended, and downlight.

40. The light fixture of claim 39 that is suspended by a wire from a ceiling.

41. The light fixture of claim 39 that is used to illuminate a floor or a ceiling.

42. The single edge-lit lighting module of claim 1 wherein a height of the light source is less than the cross-sectional height of the light scattering optical element at the input face.

43. The single edge-lit lighting module of claim 42 wherein the height of the light source is less than 4.5 mm.

* * * * *